United States Patent
Bernard et al.

(10) Patent No.: US 7,479,203 B2
(45) Date of Patent: Jan. 20, 2009

(54) LAMINATION OF DRY FILM TO MICRO-FLUID EJECTION HEAD SUBSTRATES

(75) Inventors: David L. Bernard, Lexington, KY (US); Christopher A. Craft, Paris, KY (US); Gary R. Williams, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 369 days.

(21) Appl. No.: 11/208,815

(22) Filed: Aug. 22, 2005

(65) Prior Publication Data

US 2007/0039676 A1 Feb. 22, 2007

(51) Int. Cl.
*B31B 1/60* (2006.01)
*B32B 37/00* (2006.01)
*G03C 5/00* (2006.01)

(52) U.S. Cl. .................................................. 156/308.2
(58) Field of Classification Search ............... None
See application file for complete search history.

(56) References Cited

U.S. PATENT DOCUMENTS

| | | | |
|---|---|---|---|
| 5,059,973 A * | 10/1991 | Watanabe | 347/56 |
| 6,513,917 B1 * | 2/2003 | Matsuda et al. | 347/70 |
| 7,325,309 B2 * | 2/2008 | Strand et al. | 29/890.1 |
| 7,416,629 B2 * | 8/2008 | Silverbrook et al. | 156/249 |
| 2002/0145714 A1 * | 10/2002 | Hirayanagi | 355/53 |
| 2005/0133167 A1 * | 6/2005 | Camm et al. | 156/345.51 |
| 2005/0270332 A1 * | 12/2005 | Strand et al. | 347/47 |
| 2008/0079927 A1 * | 4/2008 | Vernon | 355/75 |
| 2008/0085476 A1 * | 4/2008 | Strand et al. | 430/322 |

OTHER PUBLICATIONS

U.S. Appl. No. 11/027,705, Craig Bertelsen et al. (Lexmark).

* cited by examiner

*Primary Examiner*—Allan Olsen
(74) *Attorney, Agent, or Firm*—Luedeka, Neely & Graham, PC

(57) ABSTRACT

A method of making a micro-fluid ejection head structure and structures made by the method. The method includes planarizing a heated substrate component of a micro-fluid ejection head structure by applying a clamping voltage to an electrostatic chuck sufficient to hold the substrate component in a planarized orientation. A polymeric nozzle layer is laminated to the heated substrate component in a manner sufficient to provide a planarized nozzle layer on the substrate component.

19 Claims, 6 Drawing Sheets ations to provide substantially planarized films on the structures.

BACKGROUND AND SUMMARY

Micro-fluid ejection heads are useful for ejecting a variety of fluids including inks, cooling fluids, pharmaceuticals, lubricants and the like. A widely used micro-fluid ejection head is in an ink jet printer. Ink jet printers continue to be improved as the technology for making the micro-fluid ejection heads continues to advance. New techniques are constantly being developed to provide low cost, highly reliable printers which approach the speed and quality of laser printers. An added benefit of ink jet printers is that color images can be produced at a fraction of the cost of laser printers with as good or better quality than laser printers. All of the foregoing benefits exhibited by ink jet printers have also increased the competitiveness of suppliers to provide comparable printers in a more cost efficient manner than their competitors.

One area of improvement in the printers is in the print engine or micro-fluid ejection head itself. This seemingly simple device is a relatively complicated structure containing electrical circuits, ink passageways and a variety of tiny parts assembled with precision to provide a powerful, yet versatile micro-fluid ejection head. The components of the ejection head must cooperate with each other and with a variety of ink formulations to provide the desired print properties. Accordingly, it is important to match the ejection head components to the ink and the duty cycle demanded by the printer. Slight variations in production quality can have a tremendous influence on the product yield and resulting printer performance.

In order to improve the quality of the micro-fluid ejection heads, new techniques for assembling components of the heads are being developed. For example, instead of separately forming nozzle holes in a metal or polyimide nozzle plate material that is then adhesively attached to a thick film layer on a semiconductor substrate, a dry film photoimageable material may be laminated to an imaged and developed thick film layer made of similar materials on the semiconductor substrate. Lamination of the dry film photoimageable material to the thick film layer may be conducted by placing a photoimageable thick film layer on the substrate and passing the substrate containing the thick film layer between two heated rollers which exert a chosen pressure on the substrate and thick film layer. Fluid supply slots are formed through the semiconductor substrate up to the thick film layer. The thick film layer may then be exposed through a photomask and developed to form flow features therein. The dry film photoimageable material may then be laminated to the imaged and developed thick film layer. Another photomask is used to image the dry film photoimageable material which is then developed to provide nozzle holes.

A problem with this method of making a micro-fluid ejection head structure 10 is that during the lamination process of the dry film photoimageable material 12 to a thick film layer 14 on a semiconductor substrate 16, the dry film photoimageable material 12 can sag down into the fluid supply slot areas 18 in the semiconductor substrate 16 as illustrated in FIG. 1.

If lamination of the dry film photoimageable material 12 to the thick film layer 14 is performed before fluid supply slots are formed in the substrate 16, the dry film photoimageable material 12 can sag down and adhere to the substrate 16 in the fluid supply slot areas 20 as shown in FIG. 2. Sagging of the dry film photoimageable material used for forming the nozzle holes can result in non-functioning of the micro-fluid ejection head and/or severe performance defects in the operation of the micro-fluid ejection head.

Another problem associated with laminating materials to a semiconductor substrate for a micro-fluid ejection head is that such substrates are typically slightly bowed. During a lamination step wherein the substrates contain fluid supply slots therethrough, a vacuum chuck is unable to apply vacuum over the surface in order to effect substantial planarization of the substrate for lamination of materials thereto. Accordingly, there remains a need for improved methods of making micro-fluid ejection heads and for reducing the incidence of non-planarization of the components of the ejection heads so that operability and improved performance may be achieved.

Exemplary embodiments of the present application provide methods for making a micro-fluid ejection head structure and structures made by the methods. One such method includes planarizing a heated substrate component of a micro-fluid ejection head structure by applying a clamping voltage to an electrostatic chuck sufficient to hold the substrate component in a planarized orientation. A polymeric nozzle layer is laminated to the heated substrate component in a manner sufficient to provide a planarized nozzle layer on the substrate component.

In another embodiment, there is provided a micro-fluid ejection head structure having a substrate component. The substrate component includes a semiconductor substrate having a device side and one or more fluid feed slots therein. A flow feature layer is attached adjacent the device side of the semiconductor substrate. A nozzle film is laminated to the flow feature layer. During lamination of the nozzle film to the flow feature layer, the substrate component is electrostatically clamped to a chuck that is positioned over the nozzle film in a bonding orientation. In this orientation, the substrate component overlies the nozzle film and the device side of the semiconductor substrate is substantially downwardly facing such that gravitational forces inhibit deformation of portions of the nozzle film toward the device side of the semiconductor substrate.

Yet another exemplary embodiment provides a method of bonding a deformable film to a fluid flow structure in order to inhibit blocking of flow paths in the fluid flow structure. The method includes positioning a fluid flow structure on a first electrostatic chuck support surface. The deformable film is positioned on a second electrostatic chuck support surface. The first and second electrostatic chuck support surfaces are moved toward one another to thermally bond the fluid flow structure and deformable film to one another. During the bonding step, electrostatic forces inhibit deformation of portions of the film into the flow paths of the fluid flow structure.

An advantage of certain of the embodiments described herein can be that bowing of a semiconductor substrate may be substantially eliminated. Another advantage of the exemplary embodiments can be that sagging and other deformations of a film into the slots or flow feature areas of the semiconductor substrate structure, as occurs with conventional lamination techniques, may be substantially avoided.

BRIEF DESCRIPTION OF THE DRAWINGS

Further features and advantages of the disclosed embodiments may become apparent by reference to the detailed description when considered in conjunction with the figures, which are not to scale, wherein like reference numbers indicate like elements through the several views, and wherein.

DETAILED DESCRIPTION OF THE EXEMPLARY EMBODIMENTS

Figure 1:
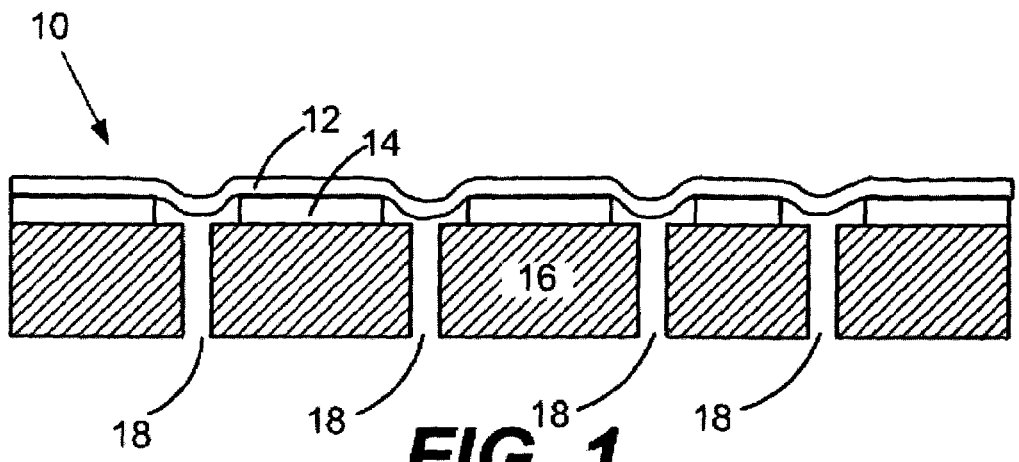
FIGS. 1 and 2 are cross-sectional views, not to scale, of prior art micro-fluid ejection heads.
Figure 2:
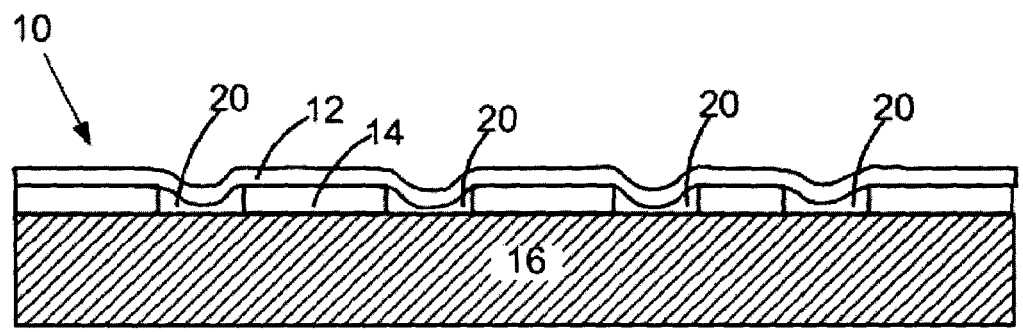

As set forth above, with reference to FIGS. 1-2, difficulties are encountered when trying to laminate the dry film photoresist 12 layer to the semiconductor substrate 16 containing the thick film layer 14 resulting in deformation of the photoresist layer 12. As described in further detail below, exemplary embodiments of the disclosure provide important advances in the art of constructing micro-fluid ejection heads that have precisely fitting components.

Figure 3:
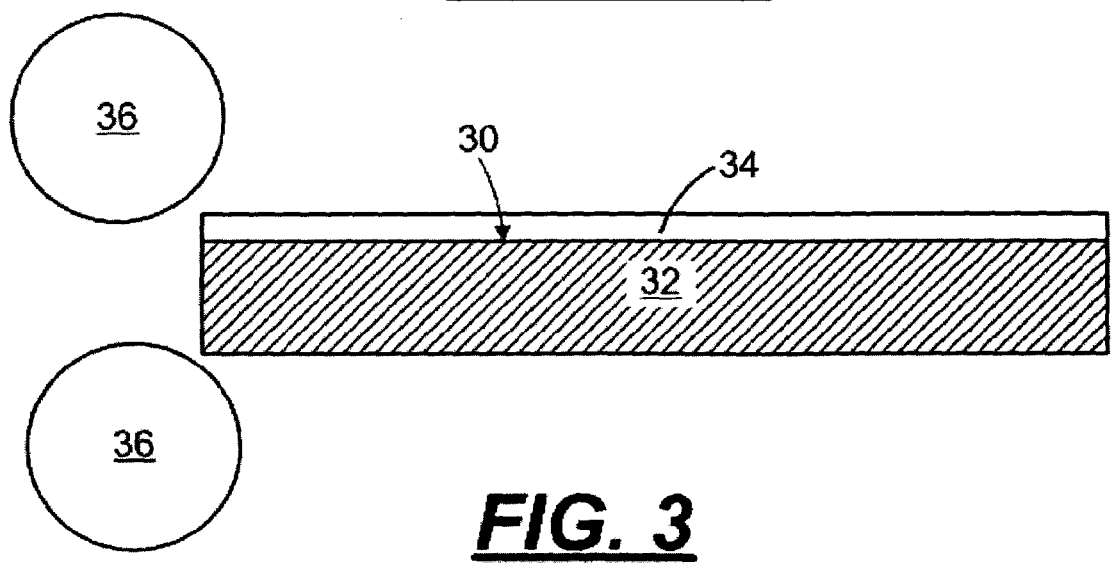
FIG. 3 illustrates a lamination process for laminating a thick film layer onto a substrate in accordance with an aspect of the disclosed embodiments.

As an initial step in the process of constructing a micro-fluid ejection head, a first photoimageable material is applied to a device surface 30 of a semiconductor substrate 32 to provide a thick film layer 34 as shown in FIG. 3. The thick film layer 34 may be provided by a positive or negative photoresist material applied to the substrate 32 as a wet layer by a spin coating process, a spray coating process, or the like. In the alternative the thick film layer 34 may be applied to the substrate 32 as a dry film photoresist material using heated pressure rolls 36. Examples of suitable photoresist materials, include, but are not limited to, acrylic and epoxy-based photoresists such as the photoresist materials available from Shell Chemical Company of Houston, Tex. under the trade name EPON SU8 and photoresist materials available from Olin Hunt Specialty Products, Inc. which is a subsidiary of the Olin Corporation of West Paterson, N.J. under the trade name WAYCOAT. Other suitable photoresist materials include the photoresist materials available from Clariant Corporation of Somerville, N.J. under the trade names AZ4620 and AZ1512. An exemplary photoresist material includes from about 10 to about 20 percent by weight difunctional epoxy compound, less than about 4.5 percent by weight multifunctional crosslinking epoxy compound, from about 1 to about 10 percent by weight photoinitiator capable of generating a cation and from about 20 to about 90 percent by weight non-photoreactive solvent as described in U.S. Pat. No. 5,907,333 to Patil et al., the disclosure of which is incorporated by reference herein as if fully set forth.

Figure 4:
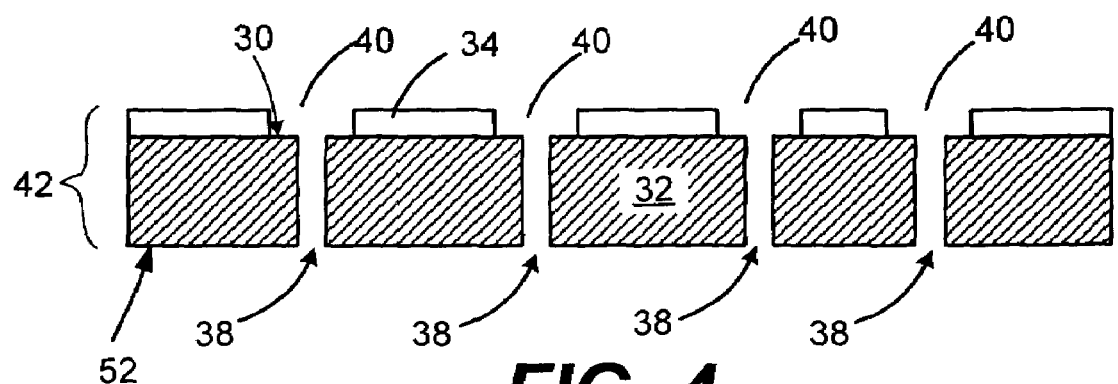
FIG. 4 is a cross-sectional view, not to scale of a substrate component after imaging and developing a thick film layer applied to a semiconductor substrate.

The semiconductor substrate 32 can be a silicon semiconductor substrate containing a plurality of fluid ejection actuators such as piezoelectric devices or heater resistors formed on the device surface 30 of the substrate 32. After coating the thick film layer 34 onto the substrate 32, flow features 40 may then be formed in the thick film layer 34 using conventional photoimaging techniques using ultraviolet light with wavelengths typically in the about 193 to about 450 nanometer range and may be developed using standard photolithographic developing techniques. Next, one or more fluid supply slots 38 may be formed through the substrate 32 as shown in FIG. 4. Techniques used for forming the slots 38 may be selected from wet and dry etch techniques or mechanical techniques such as grit blast.

Upon activation of the fluid ejection actuators, fluid supplied through the slots 38 in the semiconductor substrate 32 is caused to be ejected through nozzle holes in a nozzle member (e.g., plate) attached to the thick film layer 34 by the techniques described below. The fluid ejection actuators, such as heater resistors, are formed on the device surface 30 of the semiconductor substrate 32 by well known semiconductor manufacturing techniques.

The semiconductor substrate 32 is relatively small in size and typically has overall dimensions ranging from about 2 to about 10 millimeters wide by about 10 to about 25 millimeters long and from about 0.4 to about 0.8 mm thick. The fluid supply slots 38 typically have dimensions of about 9.7 millimeters long and 0.39 millimeters wide.

The device surface 30 of the substrate 32 can also include electrical tracing from the heater resistors to contact pads used for connecting the substrate 32 to a flexible circuit or a tape automated bonding (TAB) circuit for supplying electrical impulses from a fluid ejection controller to activate one or more of the fluid ejection actuators located on the device surface 30 of the substrate 32.

The resulting composite substrate/thick film layer 32/34 is referred to herein as a substrate component 42 for simplification purposes. While the foregoing discussion provides a photoimageable thick film layer 34 on the substrate 32, the substrate component 42 to which a nozzle member is attached by the methods described herein, may be virtually any semiconductor substrate 32 containing a thick film layer 34 as shown in FIG. 4.

Figure 5:
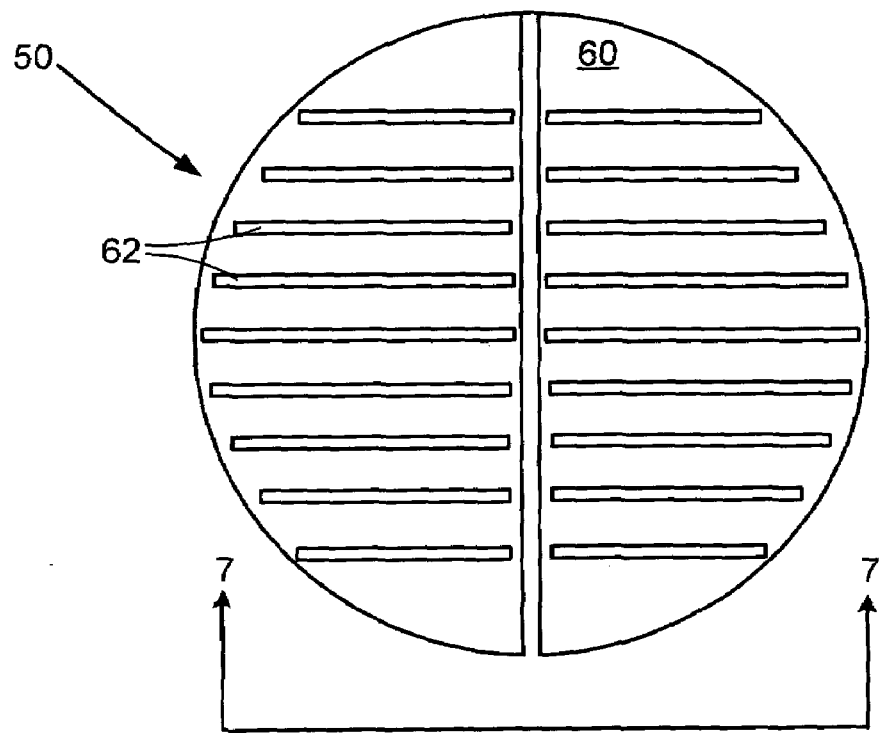
FIG. 5 is a plan view, not to scale, of an electrostatic chuck used in accordance with embodiments of the disclosure.
Figure 6:
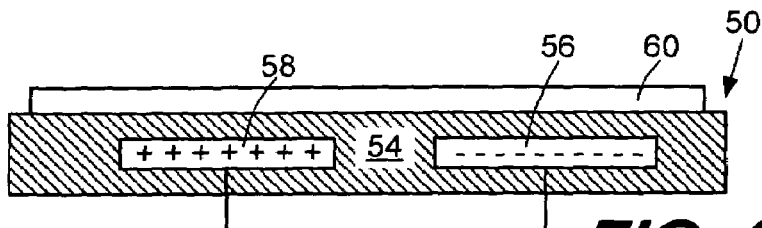
FIG. 6 is a schematic side view of the electrostatic chuck of FIG. 5.

In order to avoid the sagging and deformation problems associated with applying a dry film photoresist material to the substrate component 42 as discussed above with reference to FIGS. 1 and 2, a bonding technique between the dry film photoresist material and the substrate component 42 is provided using one or more electrostatic chucks. With reference to FIGS. 5-6, a bi-polar electrostatic chuck (ESC) 50 for use in fabricating a micro-fluid ejection head is illustrated. Unlike a vacuum chuck, the ESC 50 enables holding and placing the substrate component 42 in a substantially planar orientation even though the substrate component 42 contains the slots 38 therein. As will be appreciated by reference to FIG. 4, a vacuum chuck is unable to maintain sufficient suction except in the peripheral or edge areas 52 of the substrate component 42. However, the bi-polar ESC 50 is able to apply charges on the entire substrate component 42 in order reduce the inherent bow in the substrate component 42 during a dry film bonding step.

The ESC 50 acts like a capacitor, wherein the ESC is comprised of a ceramic plate 54 with insulated electrodes 56 and 58 and a dielectric layer 60 attached to the ceramic plate 54. Each of the electrodes 56 and 58 in the bipolar ESC 50 is provided with one polarity per electrode. This configuration creates an array of + and − charges on the substrate component 42, resulting in an electrostatic capacitively induced clamping (not unlike static cling) of the substrate component 42 to the ESC 50 with a net charge of zero to the substrate component 42. Such clamping force is very precise and repeatable, reducing any latent bow of the substrate component 42 to negligent levels and promoting uniformity of coating or lamination to the substrate component 42. Another advantage of the use of the ESC 50 can be that the clamping force places reduced stress on substrate component 42 compared to the stress induced by a vacuum clamping system. While the foregoing is particularly applicable to substrate components 42 containing the slots 38, substrate components with or without slots 38 may benefit from the use of the ESC 50.

Figure 7:
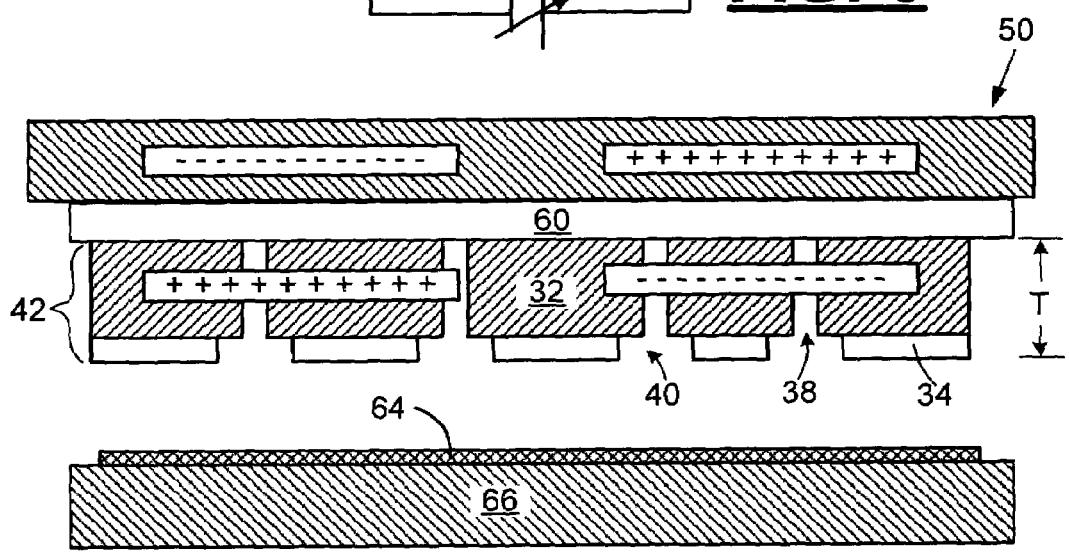
FIGS. 7-9 are schematic illustrations of methods according to the disclosure for attaching a dry film layer to a substrate component using one or more electrostatic chucks.

Because of the magnitude of the electrostatic clamping force provided by the ESC 50, the substrate component 42 may be suspended above the dry film photoimageable material to be applied to the substrate component 42. The electrostatic clamping force applied to the substrate component 42 may be provided by a clamping voltage ranging from +/−500 to +/−2000 Volts (V). At 2 KV, substrate components 42 having a total thickness T of from about 300 to about 625 microns may be suspended from the ESC 50 as shown in FIG. 7. Since substrate clamping is a function of the quality of the capacitor, increasing a surface area or dielectric constant of the ESC 50 can raise the capacitance and thus the clamping force applied to the substrate component 42. Reducing the thickness of the dielectric layer 60 and increasing the voltage applied to the electrodes 56 and 58 may also be effective to increase the capacitance and the resultant clamping force without unduly stressing the substrate component 42.

After the substrate component 42 is securely clamped to the ESC 50, a nozzle layer, described in more detail below, may be laminated to the substrate component 42 by a variety of techniques. In the case of a dry film photoimageable material providing the nozzle layer, heat and pressure may be applied to the substrate component 42.

Another advantage of the ESC 50 can be that the ESC 50 promotes repeatable and uniform heat transfer from the substrate component 42 to the nozzle layer. Repeatable and uniform heat transfer is fundamental to providing proper laminate wetting and uniform film application to the substrate component 42. Accordingly, removal of substrate component 42 bow, particularly in the center portions of the substrate component 42 is effective to improve heat transfer and wetting of the nozzle plate layer during a lamination process.

With reference again to FIG. 5, a plurality of trenches 62 may be machined into the surface of the dielectric layer 60 of the ESC 50. The trenches 62 enable the evacuation of the heated or trapped gases under a nozzle layer which may be created during the nozzle layer lamination step.

FIG. 7 provides a first exemplary method for applying a nozzle layer 64 to the substrate component 42. In this embodiment, the nozzle layer 64 is disposed on a substantially planar support 66 and the substrate component 42 is suspended above the nozzle layer 64 with the flow features 40 directed toward the nozzle layer 64. In such an orientation, sagging or distortion of the nozzle layer 64 into the flow features 40 or slots 38 is avoided as gravity will promote the planarization of the nozzle layer 64.

In the alternative, the nozzle layer 64 may be provided by an elongate film suspended between support rolls or stretched by mechanical clamping devices rather than being disposed on the planar support 66. Application of the substrate component 42 to the suspended or stretched nozzle e layer may be accomplished in a similar manner whereby sagging or distortion of the nozzle layer is substantially avoided.

Figure 8:
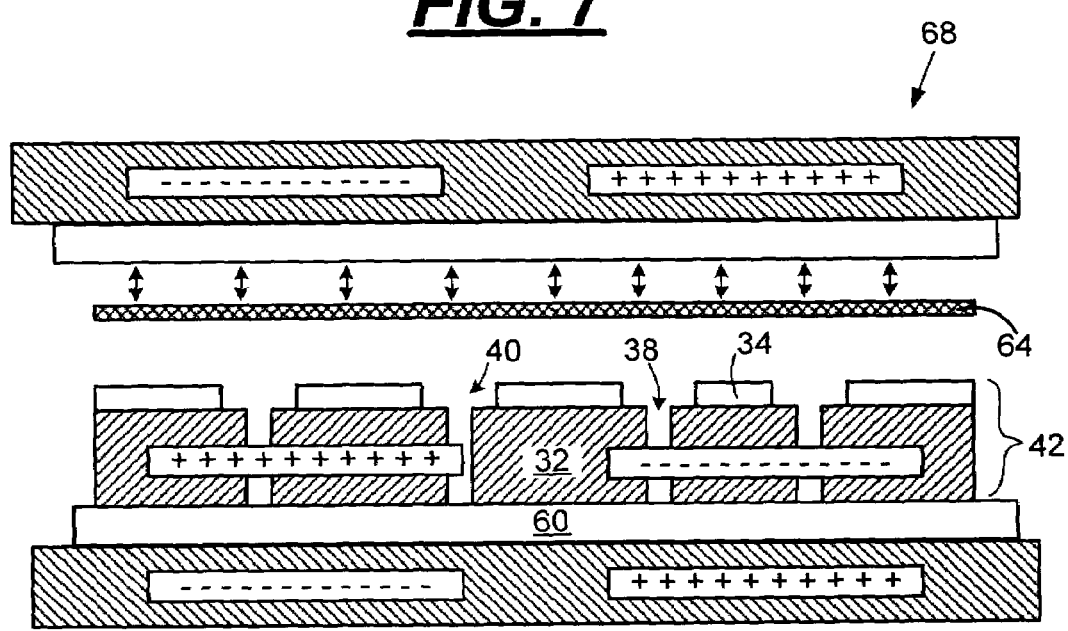

Promoting the substantially planar nozzle layer 64 and substrate component 42 during a lamination process may alternatively be provided by the method illustrated in FIG. 8. In this embodiment, the substrate component 42 may be mounted on the ESC 50 at a slight positive or negative bias. Accordingly, a relatively low voltage is sufficient to "attract" the nozzle layer 64 to the substrate component 42. As described above, the nozzle layer 64 may be suspended above the substrate component 42 in a stretched configuration, or, as shown in FIG. 8, the nozzle layer 64 may be oppositely electrostatically charged by use of a second ESC 68. The ESC 68 is similar to the ESC 50 described above. The stretched condition or slight electrostatic charge on the nozzle layer 64 is effective to promote substantial planarity of the nozzle layer 64 as the nozzle layer 64 is laminated to the substrate component 42.

Figure 9:
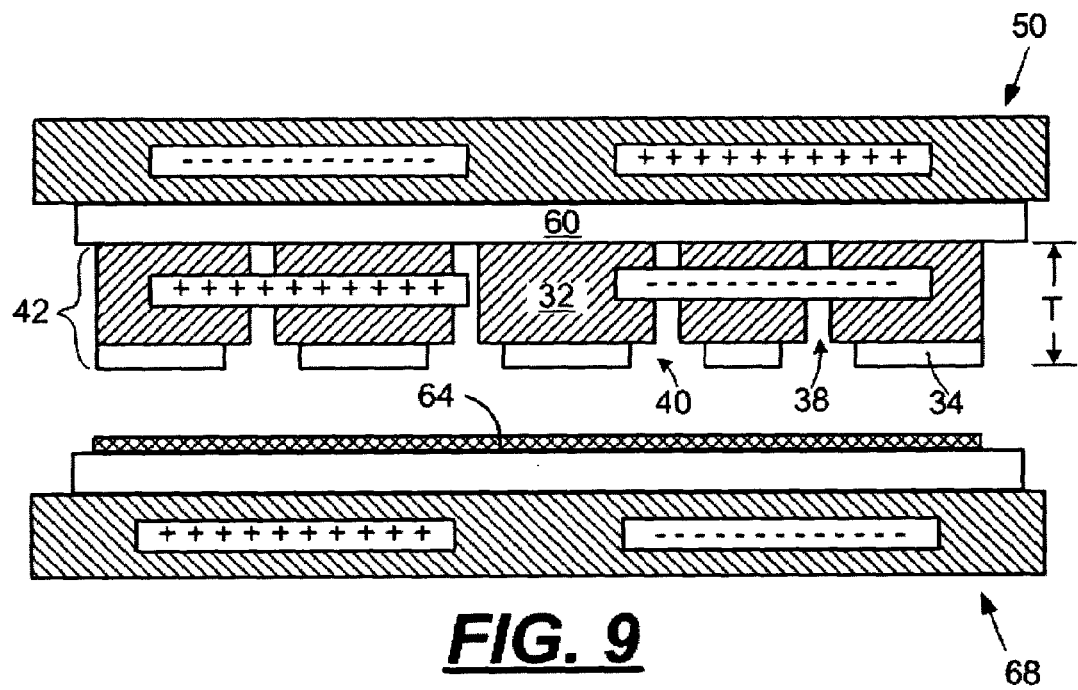

In yet another exemplary embodiment, both the substrate component 42 and the nozzle layer 64 are electrostatically clamped to their respective ESCs 50 and 68 as illustrated in FIG. 9. In this embodiment, either the nozzle layer 64 or the substrate component 42 may be suspended above the other component. Electrostatic clamping provides reduced stress on the substrate component 42 and the nozzle layer 64 sufficient to promote the relative flatness or planarity of the substrate component 42 and the nozzle layer 64. The ESCs 50 and 68 are also effective to promote substantially uniform heat transfer to the substrate component 42 and the nozzle layer 64. Accordingly, use of one or more ESCs 50 and/or 68 provides a method that effectively prevent sagging or distortion of the nozzle layer 64 during the lamination step.

Lamination of the nozzle layer 64 to the substrate component 42 may be effected using heat and/or pressure in a single or double roll laminator or in a vacuum laminator as described below. For the purposes of the disclosure, the nozzle layer 64 may include a wide variety of materials that may be provided as a dry film for lamination to the substrate component 42. Such materials, include but are not limited to epoxies, acrylates, polyimides and the like. Such layers 64 are relatively thin and have a thickness ranging from about 5 to about 100 microns. In exemplary embodiments, the nozzle layer 64 has a thickness sufficient to provide nozzle holes therein.

A particularly suitable nozzle layer 64 is a dry film photoresist material which may be imaged through a photomask and developed to form nozzle holes therein. Typical dry film photoresist materials which may be used include, but are not limited to, photoresist materials available from E. I. DuPont de Nemours and Company of Wilmington, Del. under the trade names RISTON and ORDYL PR100 from Tokyo Ohka Kobyo Co., LTD. Kanagawa, Japan. The dry film photoresist material should be compatible with the material of the thick film layer 34 so that wetting and adhesion of the layers 34 and 64 to one another may be effected by heat and/or pressure alone. In an alternative embodiment, either one or both of the thick film layer 34 and nozzle layer 64 may contain an adhesive for promoting adhesion of one layer to the other.

Figure 10:
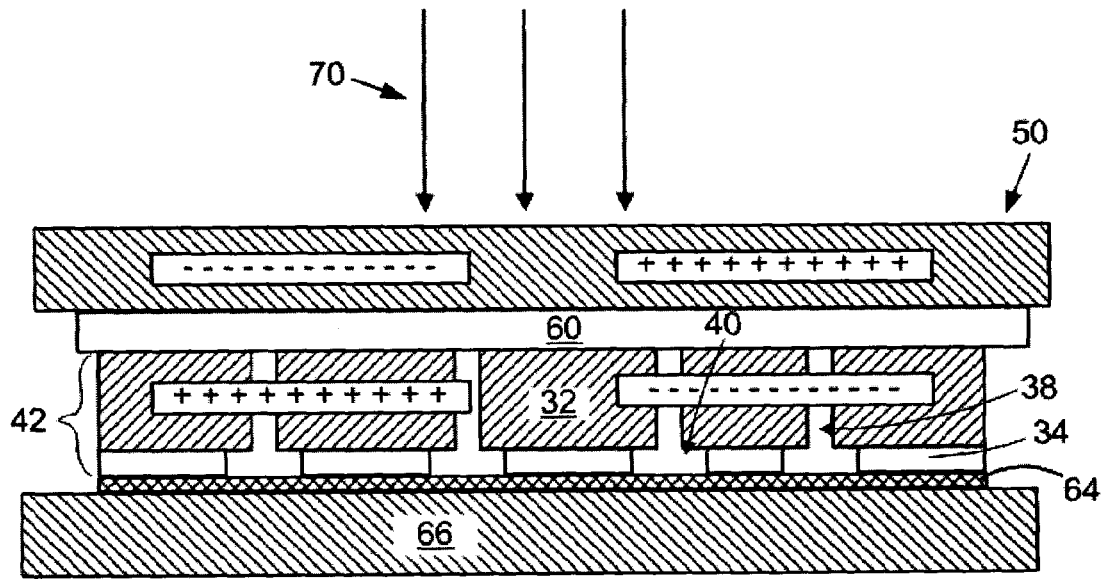
FIGS. 10-12 are schematic illustrations of methods for bonding a dry film layer to a substrate component in accordance with disclosed embodiment.

In a first lamination method illustrated in FIG. 10, a thermocompression bonder is used to attach the substrate component 42 and nozzle layer 64 to one another by applying pressure and heat to the ESC 50 while the substrate component 42 is suspended above the nozzle layer 64 as described above with reference to FIG. 8. As shown in FIG. 10 the substrate component 42 overlies the nozzle layer 64 that is either suspended between rolls or disposed on the planar support 66. The thermocompression bonder is closed so that heat and pressure (represented by downwardly extending arrows 70) is applied to bond the substrate component 42 and nozzle layer 64 to one another. Desired temperature and pressure conditions are preferably in the range of from about 30° to about 150° C. and from about 5 to about 80 psig. By performing lamination in this manner, it has been observed that the sagging and other deformations of the nozzle layer 64 into the slots 38 and/or flow features 40, as occurs with conventional techniques, is substantially avoided. A modified heated hydraulic press from Carver, Inc. of Wabash, Ind. may be used as a thermocompression bonder.

Figure 11:
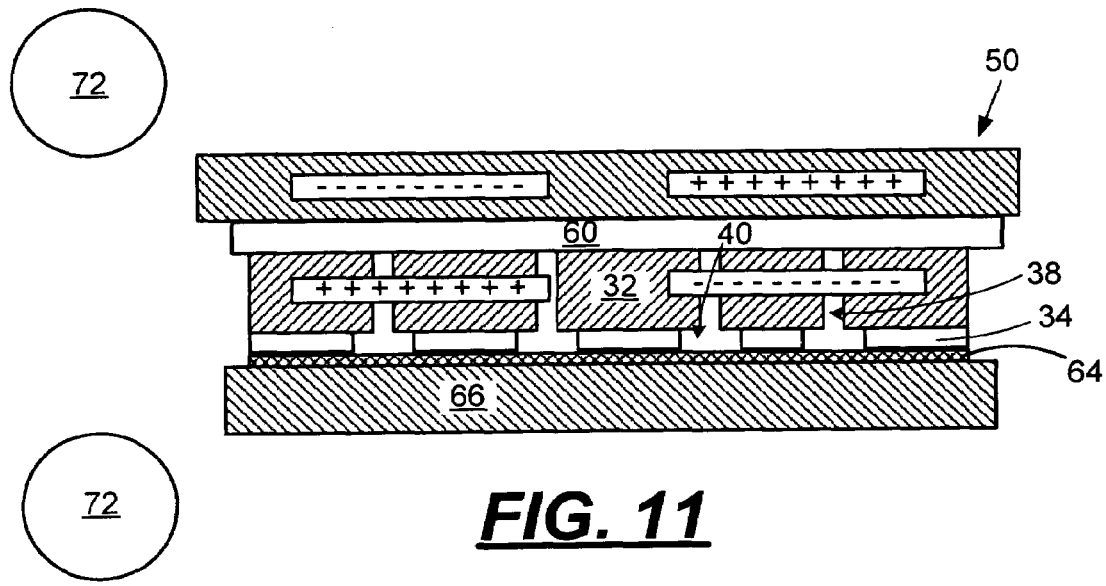

With reference to FIG. 11, an alternate method for laminating the nozzle layer 64 to the substrate component 42 is illustrated. In this method, a hot roll laminator having heated rollers 72 is used in conjunction with the planar support 66 and ESC 50. The planar support 66 can be substantially flat and has substantially the same shape as the substrate component 42. The nozzle layer 64 is first placed on the planar support 66 and the substrate component 42, electrostatically clamped to the ESC 50, is positioned over the layer 64 so that the device surface 30 of the substrate component 42 is downwardly facing. Next, the thus oriented composite structure 42/64 is processed through the heated rollers 72 of the roll laminator at a desired temperature and pressure ranging from about 40° to about 150° C. and from about 5 to about 80 psig. A hot roll laminator available from Western Magnum Corporation of El Segundo, Calif. under the trade name XRL-120 may be used in this embodiment as the laminator.

Figure 12:
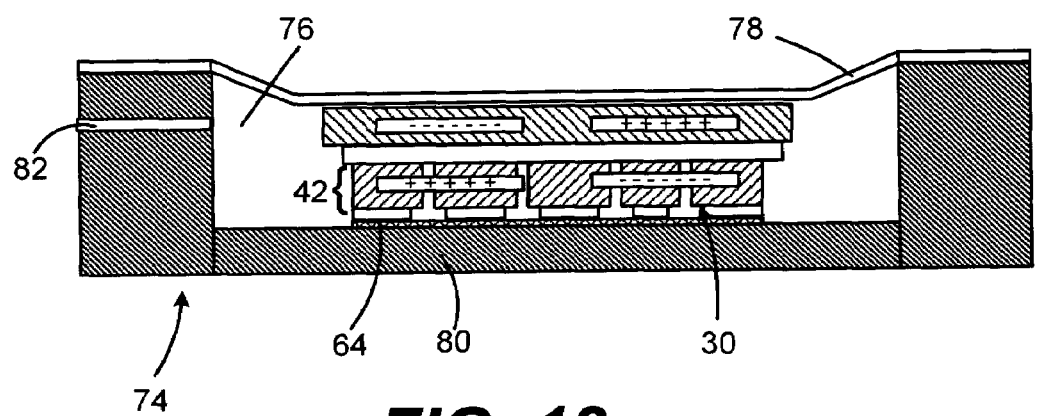

Yet another method for bonding the nozzle layer 64 to the substrate component 42 is illustrated in FIG. 12. In this embodiment, a vacuum laminator device 74 having a chamber 76 sealable as by a flexible membrane 78 is used. Heat may be applied to the chamber 76 as by a heating element associated with a floor 80 of the chamber 76. Negative pressure is applied to the chamber 76 as by a vacuum pump in flow communication with the chamber 76 through a vacuum conduit 82. The nozzle layer 64 is first placed on the floor 80 or on the ESC 68 between the layer 64 and the floor 80, and the substrate component 42, attached to ESC 50, is positioned over the layer 64 so that the device surface 30 of the substrate component 42 is downwardly facing toward the floor 80. The membrane 78 is installed to seal the chamber 76, the chamber 76 is heated at a temperature ranging from about 40° to about 150° C., and a negative pressure in the range of from about 5 to about 25 inches of mercury is applied to the chamber 76 such that the membrane 78 is forced against the back of the ESC 50 to force the substrate component 42 against the layer 64 under conditions of heat and pressure, thereby laminating the layer 64 to the substrate component 42.

In yet another alternative method, the nozzle layer 64 may be laminated to the substrate component 42 in the absence of heat. For example, the nozzle layer 64 may be placed on the support 66. A solvent with solubility parameters ranging from about 17 to about 26 $(MPa)^{1/2}$ is applied to the thick film layer 34 to render it tacky or adhesive and the substrate component 42 is positioned over the layer 64 so that the device surface 30 of the substrate component 42 is downwardly facing. Pressure may then be applied to press the substrate component 42 and the layer 64 together to achieve bonding therebetween in the absence of heat being applied during the bonding process.

Figure 13:
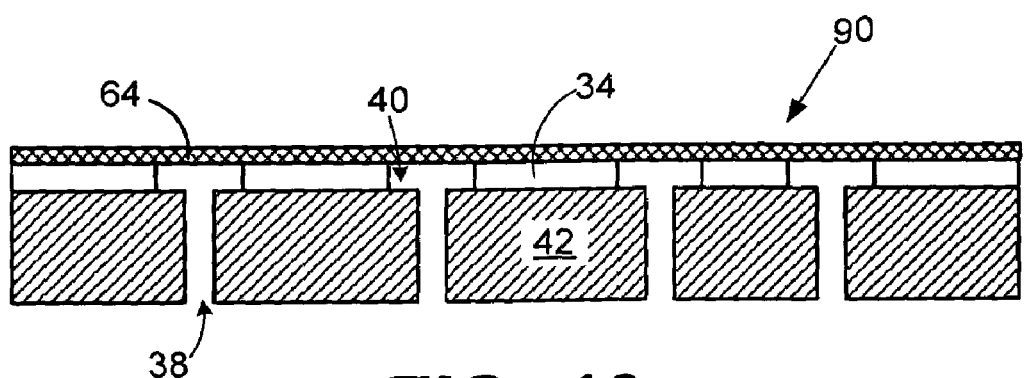
FIGS. 13 and 14 are schematic illustrations of substrate components containing a nozzle plate layer before and after forming nozzle holes in the nozzle plate layer.
Figure 14:
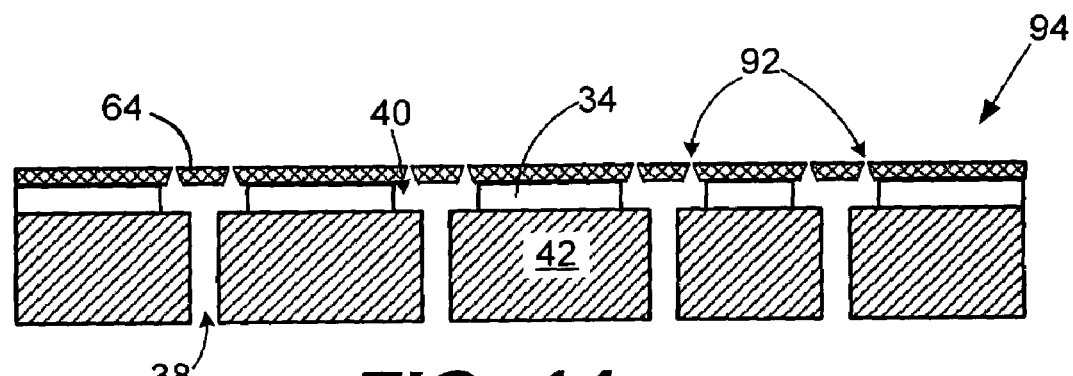

Once the nozzle layer 64 is laminated to the substrate component 42 by one of the foregoing methods, to provide the composite structure 90 illustrated in FIG. 13, nozzle holes 92 may be photoimaged and developed in the nozzle layer 64 by conventional photolithographic techniques to provide a micro-fluid ejection head 94 (FIG. 14) having improved operating characteristics.

The micro-fluid ejection head 94 may be attached in a well known manner to a chip pocket in a cartridge body to form micro-fluid ejection cartridge. Fluid to be ejected can be supplied to the micro-fluid ejection head from a fluid reservoir in the cartridge body generally opposite the chip pocket.

The cartridge body can be made of a metal or a polymeric material selected from the group consisting of amorphous thermoplastic polyetherimide available from G. E. Plastics of Huntersville, N.C. under the trade name ULTEM 1010, glass filled thermoplastic polyethylene terephthalate resin available from E. I. du Pont de Nemours and Company of Wilmington, Del. under the trade name RYNITE, syndiotactic polystyrene containing glass fiber available from Dow Chemical Company of Midland, Mich. under the trade name QUESTRA, polyphenylene oxide/high impact polystyrene resin blend available from G. E. Plastics under the trade names NORYL SE1 and polyamide/polyphenylene ether resin available from G. E. Plastics under the trade name NORYL GTX. An exemplary polymeric material for making the cartridge body is NORYL SE1 polymer.

The disclosed embodiments, as set forth therein, enable attachment of nozzle films in a manner that avoids many of the shortcomings of conventional manufacturing methods thereby providing an advantage over conventional micro-fluid ejection head manufacturing processes.

Having described various aspects and embodiments of the disclosure and several advantages thereof, it will be recognized by those of ordinary skills that the embodiments are susceptible to various modifications, substitutions and revisions within the spirit and scope of the appended claims.

What is claimed is:

1. A method of bonding a deformable film to a fluid flow structure in order to inhibit blocking of flow paths in the fluid flow structure comprising:
    positioning a fluid flow structure on a first electrostatic chuck support surface;
    positioning the deformable film on a second electrostatic chuck support surface; and
    moving the first and second electrostatic chuck support surfaces toward one another to thermally bond the fluid flow structure and deformable film to one another;
    whereby electrostatic forces inhibit deformation of portions of the film into the flow paths of the fluid flow structure.

2. The method of claim 1 further comprising the step of applying pressure to the fluid flow structure to urge the structure toward the film to effect lamination of the film to the fluid flow structure.

3. The method of claim 1, wherein the pressure is applied by use of thermocompression bonder.

4. The method of claim 1, wherein the pressure is applied by use of a pair of rollers.

5. The method of claim 1, wherein the pressure is applied by use of a vacuum laminator.

6. The method of claim 1, wherein the film comprises a dry film photoresist material.

7. The method of claim 1, wherein the fluid flow structure includes flow paths defined on a layer of a photoresist material applied to a semiconductor substrate.

8. A method of making a micro-fluid ejection head structure comprising: planarizing a heated substrate component of a micro-fluid ejection head structure by applying a clamping voltage to an electrostatic chuck sufficient to hold the substrate component in a planarized orientation while laminating a polymeric nozzle layer to the heated substrate component in a manner sufficient to provide a planarized nozzle layer on the substrate component.

9. The method of claim 8, wherein the nozzle layer comprises a dry film photoresist material, further comprising imaging and developing a plurality of nozzle holes in the nozzle layer after the nozzle layer is laminated to the substrate component.

10. The method of claim 8, wherein the polymeric nozzle layer is mechanically stretched.

11. The method of claim 8, wherein the polymeric nozzle layer is attached to a second electrostatic chuck.

12. The method of claim 8, wherein the substrate component overlies the nozzle layer and a device surface of the substrate component is substantially downwardly facing so that gravitational forces inhibit deformation of portions of the nozzle layer as it is laminated to the substrate component.

13. The method of claim 8, further comprising the act of applying pressure to the substrate component to urge the substrate component toward the nozzle layer to effect lamination of the nozzle layer to the substrate component.

14. The method of claim 13, wherein the pressure is applied by use of thermocompression bonder.

15. The method of claim 13, wherein the pressure is applied by use of a pair of rollers.

16. The method of claim 13, wherein the pressure is applied by use of a vacuum laminator.

17. The method of claim 8, wherein the substrate component comprises a semiconductor substrate containing a plurality of fluid ejector actuators on a device surface thereof and a thick film layer on the device surface of the semiconductor substrate.

18. The method of claim 17, wherein the semiconductor substrate contains one or more fluid supply slots therein.

19. The method of claim 18, wherein the thick film layer contains a plurality of fluid chambers and fluid supply channels therein.

* * * * *